US009183779B2

(12) United States Patent
Soto

(10) Patent No.: US 9,183,779 B2
(45) Date of Patent: Nov. 10, 2015

(54) AMOLED LIGHT SENSING

(75) Inventor: Walter Soto, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 900 days.

(21) Appl. No.: 13/403,267

(22) Filed: Feb. 23, 2012

(65) Prior Publication Data

US 2013/0221856 A1 Aug. 29, 2013

(51) Int. Cl.
G09G 3/32 (2006.01)
G06F 3/041 (2006.01)
G06K 9/00 (2006.01)

(52) U.S. Cl.
CPC ............ G09G 3/3233 (2013.01); G06F 3/0412 (2013.01); G06K 9/0004 (2013.01); *G09G 2300/0861* (2013.01); *G09G 2310/0256* (2013.01); *G09G 2320/0626* (2013.01); *G09G 2330/021* (2013.01); *G09G 2360/144* (2013.01); *G09G 2360/148* (2013.01)

(58) Field of Classification Search
CPC ...................................... G09G 3/325
See application file for complete search history.

(56) References Cited

U.S. PATENT DOCUMENTS

| 7,348,946 | B2 | 3/2008 | Booth, Jr. et al. |
| 7,423,617 | B2 | 9/2008 | Giraldo et al. |
| 8,063,871 | B2 | 11/2011 | Lee et al. |
| 8,669,924 | B2 | 3/2014 | Kuo et al. |
| 8,674,964 | B2 | 3/2014 | Huang et al. |
| 2002/0030647 | A1 | 3/2002 | Hack et al. |
| 2003/0122749 | A1 | 7/2003 | Booth, Jr. et al. |
| 2004/0100463 | A1* | 5/2004 | Miyagawa et al. ............ 345/212 |
| 2004/0245438 | A1 | 12/2004 | Payne et al. |
| 2006/0015272 | A1 | 1/2006 | Giraldo et al. |
| 2006/0055631 | A1* | 3/2006 | Yoshida ........................ 345/46 |

(Continued)

FOREIGN PATENT DOCUMENTS

| CN | 1608281 A | 4/2005 |
| CN | 1711479 A | 12/2005 |

(Continued)

OTHER PUBLICATIONS

Communication from the Examining Division of the European Patent Office, directed to related European Patent Application No. 12 005 848.2, Munich, Germany, mailed Apr. 9, 2014; 13 pages.

(Continued)

*Primary Examiner* — Thomas J Hiltunen
(74) *Attorney, Agent, or Firm* — Sterne, Kessler & Goldstein & Fox P.L.L.C.

(57) ABSTRACT

The present disclosure is directed to a method and apparatus for estimating ambient light conditions for an OLED display. Embodiments of the method and apparatus use one or more columns of OLEDs in the display to perform two functions: their typical function of emitting light in a display mode, and the additional function of sensing light in a sense mode. To perform the additional sense mode functionality, the one or more columns of OLEDs in the display are temporarily placed into a photovoltaic and/or photoconductive mode. A sensing circuit is used to measure this current produced by the one or more columns of OLEDs while operating in the sense mode and report it back to a controller. The controller can then use this information to estimate the ambient light conditions of the environment where the OLED display is currently operating and to perform a touch and/or proximity sensing function.

22 Claims, 7 Drawing Sheets

(56) References Cited

U.S. PATENT DOCUMENTS

| | | |
|---|---|---|
| 2006/0114176 A1* | 6/2006 | Furuie et al. ............... 345/45 |
| 2007/0252005 A1 | 11/2007 | Konicek |
| 2008/0048951 A1* | 2/2008 | Naugler et al. ............. 345/82 |
| 2008/0094009 A1* | 4/2008 | Koyama et al. ........... 315/307 |
| 2010/0156881 A1* | 6/2010 | Kohno et al. ............. 345/213 |
| 2010/0214140 A1* | 8/2010 | Reinhold et al. ......... 341/118 |
| 2010/0225634 A1* | 9/2010 | Levey et al. ............. 345/212 |
| 2014/0225883 A1* | 8/2014 | Chaji et al. .............. 345/212 |
| 2014/0340436 A1* | 11/2014 | Kumeta et al. ........... 345/691 |

FOREIGN PATENT DOCUMENTS

| | | |
|---|---|---|
| CN | 101241688 A | 8/2008 |
| DE | 103 59 881 A1 | 7/2005 |
| EP | 1 956 584 A2 | 8/2008 |
| TW | 201103143 A1 | 1/2011 |
| TW | 201131752 A1 | 9/2011 |
| WO | WO 03/054980 A2 | 7/2003 |
| WO | WO 2004/042413 A1 | 5/2004 |

OTHER PUBLICATIONS

European Search Report directed to related European Patent Application No. 12005848.2, mailed on Oct. 21, 2014; 17 pages.
European Search Report for European Patent Application No. EP 12 00 5848, Munich, Germany, mailed on Jan. 24, 2013.
Chinese Office Action issued in related Chinese Application No. 201210366471.5, dated Oct. 10, 2014, 7 pages.
Office Action directed to related Taiwanese Patent Application No. 101133026, mailed on Jan. 28, 2015; 7 pages.

* cited by examiner

AMOLED LIGHT SENSING

FIELD OF THE INVENTION

This application relates generally to light sensing and, more particularly to, light sensing in an organic light emitting diode (OLED) display.

BACKGROUND

An OLED converts electrical energy into light through a phenomenon called electroluminescence. To produce electroluminescence, the OLED is forward biased with an external voltage causing electrons and holes to be injected into an organic (carbon-based) material of the OLED. The electrons and holes combine in the organic material into an electron-hole pair and, in the process, emit a photon of light.

FIG. 1 shows an example OLED 100 formed on a substrate 102, such as glass. OLED 100 includes an anode 104, a cathode 106, and two or more layers of organic material 108. When a voltage source 110 with sufficient potential is applied as shown in FIG. 1, OLED 100 becomes forward biased and a current flows from cathode 106 to anode 104. Cathode 106 provides electrons to organic material 108, and anode 104 removes electrons from organic material 108 or, equivalently, gives holes to organic material 108. The electrons and holes combine in organic material 108 and emit photons of light through the phenomenon of electroluminescence. In general, as the current flowing from cathode 106 to anode 104 is increased, more electrons and holes are injected into organic material 108 and more photons of light are emitted thereby increasing the brightness or luminance of OLED 100. The color of the light emitted by OLED 100 depends on the type of organic molecules in organic material 108.

An array of OLEDs, such as OLED 100, can be deposited and patterned on a substrate to form a display. The brightness or luminance of each OLED in the array can be individually controlled to form an image viewable on the display. Today, such OLED display technology is used in a wide range of electronic devices and appliances, from small handheld mobile phones all the way up to large-panel TVs. The power consumption associated with OLED displays, although often superior to liquid crystal displays, can be relatively high because they are often driven with sufficient power to provide enough light output to compete with the strongest ambient light environments that they may be operated within, such as outdoor environments where sunlight can be strong.

One solution used to combat the issue of high power consumption is the inclusion and positioning of an ambient light sensor on the outer surface of an OLED display. The ambient light sensor is used to estimate the ambient light conditions of the environment where the OLED display is currently operating, which is then used to adjust the brightness of the OLEDs in the display to meet, but not greatly exceed, the brightness required for the ambient light conditions. Although this solution can improve power consumption, the addition of an ambient light sensor adds cost to the display and increases its overall size. In addition, for mobile devices such as smart phones or tablets, the ambient light sensor is prone to being obstructed by a user's hand or finger, or by a portion of the mobile device protective cover, making the ambient light sensor useless.

Therefore, what is needed is a method and apparatus for estimating ambient light conditions for an OLED display, while at the same time eliminating the need for a traditional ambient light sensor and the drawbacks associated therewith.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
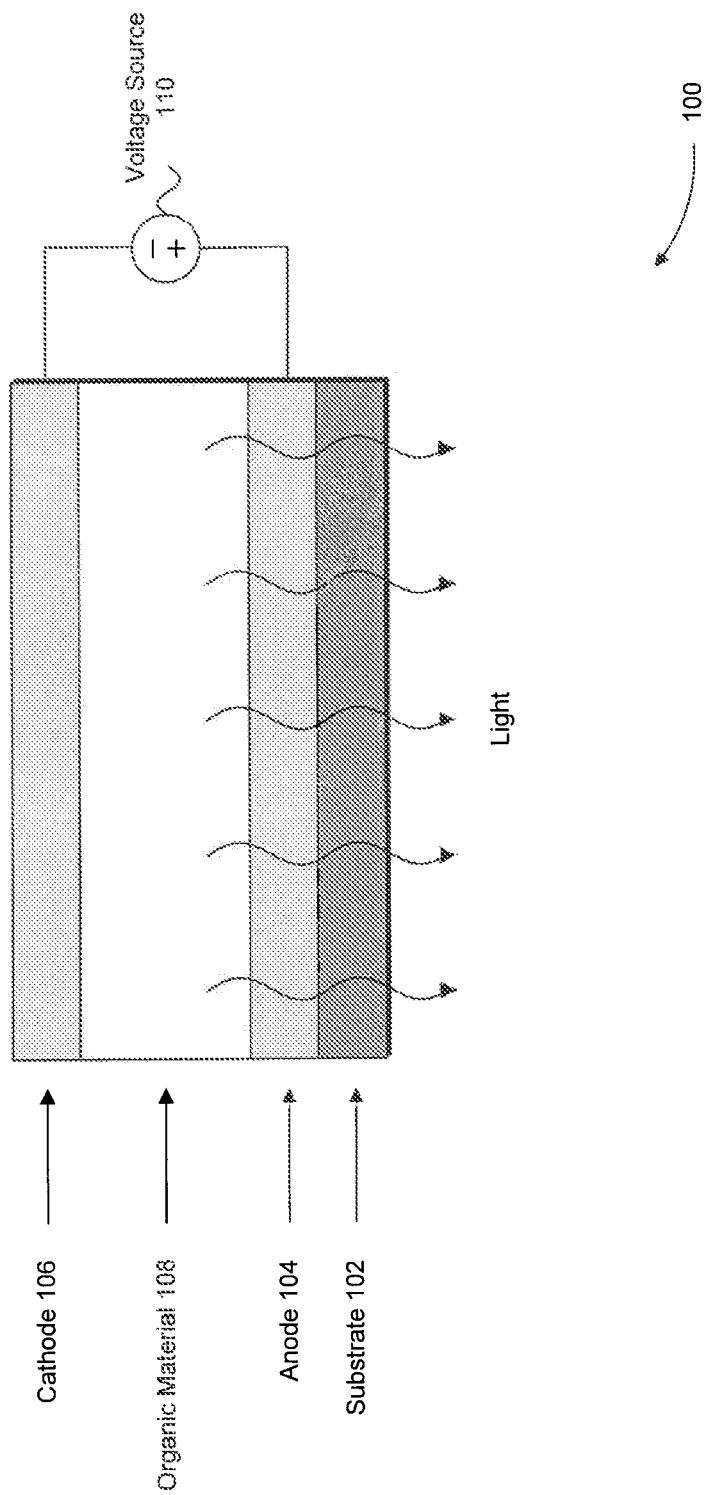
FIG. 1 illustrates an example OLED formed on, a substrate.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

I. Overview

The present disclosure is directed to a method and apparatus for estimating ambient light conditions for an OLED display, while at the same time eliminating the need for a traditional ambient light sensor and the drawbacks associated therewith. Embodiments of the method and apparatus use one or more columns of OLEDs in the display to perform two functions: their typical function of emitting light in a display mode, and the additional function of sensing light in a sense mode. To perform the additional sense mode functionality, the one or more columns of OLEDs in the display are temporarily placed into a photovoltaic and/or photoconductive mode. In the photovoltaic mode, the OLEDs are unbiased, while for the photoconductive mode an external reverse bias is applied across the OLEDs. When an OLED is not biased in the photovoltaic mode or under reverse bias in the photoconductive mode, the OLED operates as a photodiode that is capable of converting light into current.

The method and apparatus of the present disclosure uses a sensing circuit to measure this current produced by the one or more columns of OLEDs while operating in the sense mode and report it back to a controller. The magnitude of the current is representative of the intensity of the light striking the one or more columns of OLEDs and can be used by the controller to estimate the ambient light conditions of the environment where the OLED display is currently operating. The ambient light can come from several light sources, including the OLEDs in the display themselves (e.g., via reflections off of objects in the environment where the OLED is currently operating). In fact, reflected light from the OLEDs in the display becomes the dominant, ambient light source in a dark room. Once estimated, the controller can then use the estimated ambient light to adjust the brightness or luminance of the OLEDs in the display to meet, but not greatly exceed, the brightness or luminance required for the ambient light conditions, thereby reducing the power consumed by the display. In addition, the method and apparatus of the present disclosure can further use the estimated ambient light conditions to perform a touch and/or proximity sensing function. Thus, traditional ambient light sensors that optionally perform proximity sensing functions and traditional Passive or Capacitive Touch Panels and Touch Controllers can be eliminated as their functions can be replaced with the method and apparatus of the present disclosure. Additionally, traditional stylus pens designed for Passive or Capacitive Touch Panels can be replaced with stylus pens in the form of a light or LED pen (e.g., a pen that outputs light at its tip), or similar stylus pens designed to influence OLED light sensing circuits. These and other features of the method and apparatus of the present disclosure will be described further below with reference to FIGS. 2-7.

II. Dual-Function OLED device

Figure 2:
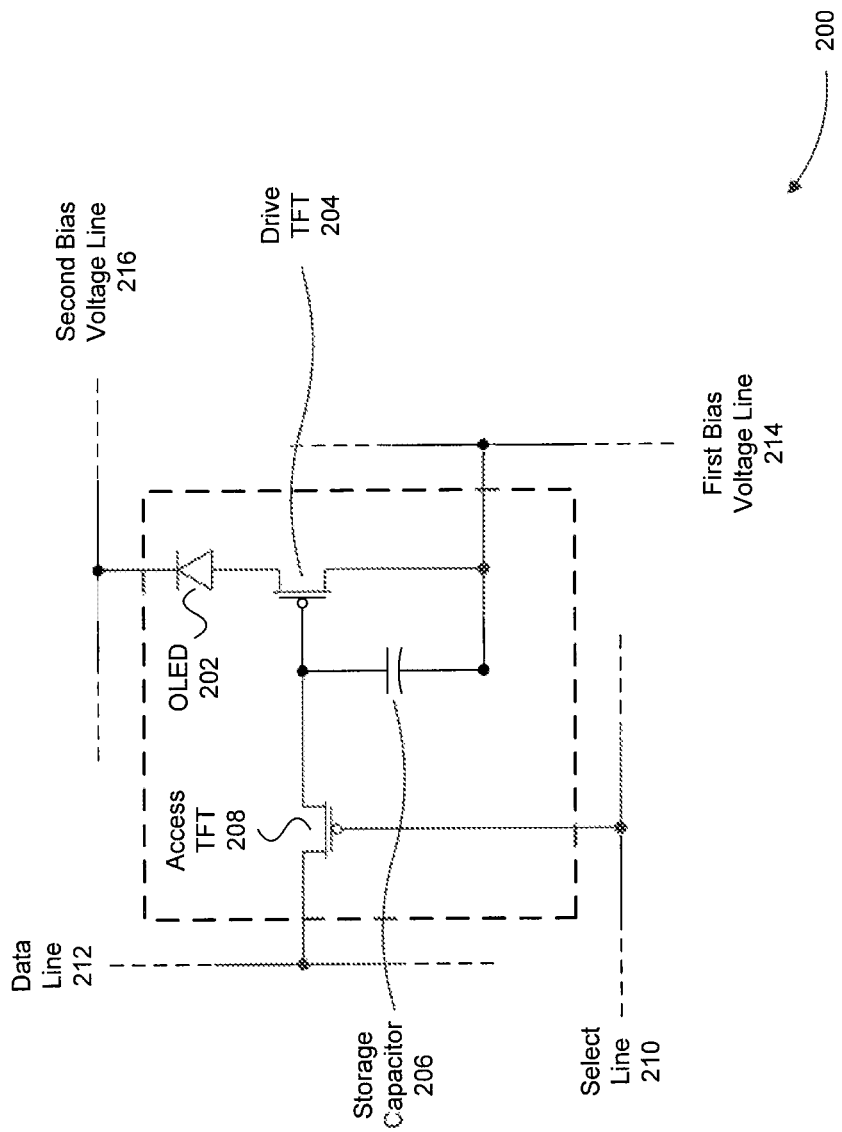
FIG. 2 illustrates an example AMOLED pixel circuit in accordance with embodiments of the present disclosure.

As noted above, the brightness or luminance of an OLED, while forward biased, can be controlled through regulation of the current that passes through it. Therefore, pixel circuits are used in OLED displays to control the current flow through the OLEDs making up the displays so that an image can be formatted. For example, in an active matrix OLED (AMOLED) display, the pixel circuits include at least two thin film transistors (TFTs) and a storage capacitor to control the current flow through an OLED. FIG. 2 illustrates one example of such a pixel circuit 200 for an AMOLED display that includes an OLED 202, a drive TFT 204, a storage capacitor 206, and an access TFT 208.

In operation, a controller (not shown) selects pixel circuit 200 in an array of pixel circuits using select line 210 and programs the brightness or luminance of OLED 202 using data line 212. More specifically, the controller places an appropriate voltage on select line 210 to turn on access TFT 208 and, once access TFT 208 is on, the controller places an appropriate voltage on data line 212 to program a voltage on the gate of drive TFT 204 such that OLED 202 provides a desired brightness or luminance.

Storage capacitor 206 is used to prevent discharge (due to leakage through access TFT 208) of the voltage programmed on the gate of drive TFT 204. By preventing discharge of the voltage programmed on the gate of drive TFT 204, storage capacitor 206 allows continuous driving of OLED 202 by drive TFT 204 at the desired brightness or luminance while other pixels in the display are selected and programmed. Drive TFT 204 drives OLED 204 using power supplied by a positive voltage source coupled across first bias voltage line 214 and second bias voltage line 216. The positive voltage source also forward biases OLED 202.

Drive TFT 204 is biased in saturation (i.e., $|V_d|>|V_{gs}-V_t|$) during normal operation of pixel circuit 200 such that is behaves as a constant current source controlled by the voltage programmed on its gate. Thus, changing the voltage programmed on the gate of drive TFT 204 changes the current through OLED 202 and, thereby, controls its brightness or luminance in a predictable manner. The brightness or luminance of each OLED in an array of pixels can be individually programmed using the configuration of pixel circuit 200 to format an image for display.

The present disclosure is directed to a method and apparatus for controlling pixel 200 to perform, in addition to emitting light in a display mode as described above, the function of sensing light in a sense mode. To perform the additional sense mode functionality, OLED 202 in pixel circuit 200 is placed into a photovoltaic and/or photoconductive mode. In the photovoltaic mode, OLED 202 is unbiased, while in the photoconductive mode an external reverse bias is applied across OLED 202. When OLED 202 is not biased (in the photovoltaic mode) or under reverse bias (in the photoconductive mode), OLED 202 operates as a photodiode that is capable of converting light that strikes its surface into current.

The controller (not shown) is configured to place OLED 202 in a photovoltaic and/or photoconductive mode by controlling the voltage applied across first bias voltage line 214 and second bias voltage line 216. More specifically, the controller can alternately switch the voltage applied across first bias voltage line 214 and second bias voltage line 216 from a positive voltage (sufficient to forward bias OLED 202) while operating in the display mode, to be either zero or a negative voltage (sufficient to reverse bias OLED 202) while operating in the sense mode.

When pixel 200 is to operate in the sense mode, the controller is further configured to bias drive TFT 204 in its linear region (i.e., $|V_d|<|V_{gs}-V_t|$), as opposed to its saturation region when pixel circuit 200 is functioning in the display mode. The controller can do this by programming an appropriate voltage on the gate of drive TFT 204.

It should be noted that pixel circuit 200 provides only one example of a pixel circuit for an AMOLED display. Other pixel circuits can be further used in embodiments of the present disclosure. For example, other pixel circuits with additional circuitry (e.g., for compensating non-uniformities and stability issues associated with TFTs), different TFT types (e.g., n-type rather than p-type), and/or different programming methods (e.g., current-programming rather than voltage-programming) can be used. However, each pixel circuit implementation will generally include a drive TFT having its channel in series with an OLED, similar to drive TFT 204 and OLED 202 in FIG. 2.

Figure 3:
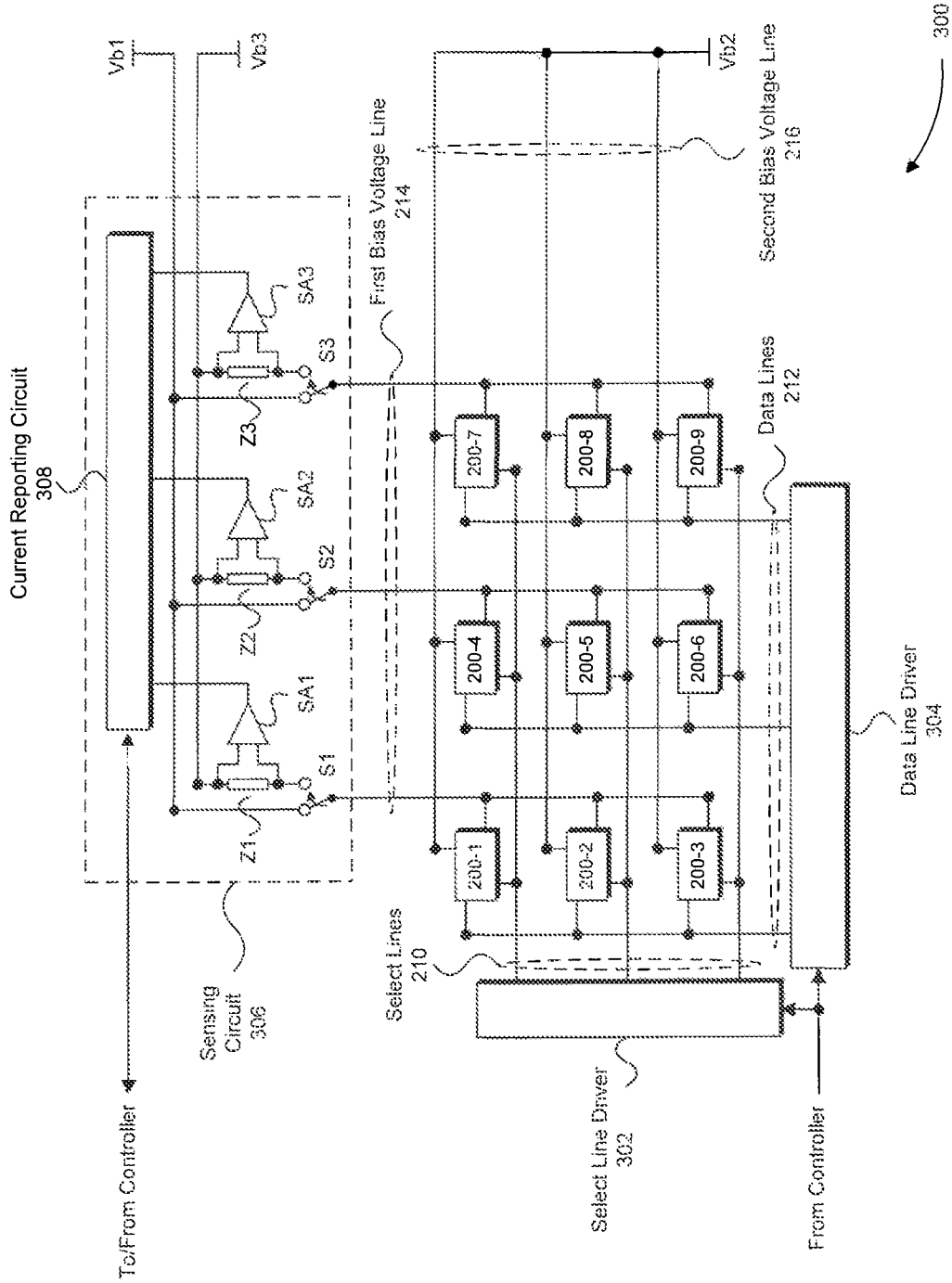
FIG. 3 illustrates a dual-function AMOLED display with pixel circuits that can function to both emit light and sense light in accordance with embodiments of the present disclosure.

Referring now to FIG. 3, a dual-function AMOLED display 300 with an array of pixel circuits 200-1 through 200-9 (each with the same orientation and construction as pixel circuit 200 in FIG. 2) that can function to both emit light in a display mode and sense light in a sense mode is illustrated in accordance with embodiments of the present disclosure. AMOLED display 300 specifically includes, in addition to the array of pixel circuits 200-1 through 200-9, a select line driver 302, a data line driver 304, and a sensing circuit 306.

In operating one or more of pixel circuits 200-1 through 200-9 in the display mode, select line driver 302 and data line driver 304 work together under the control of a controller (not shown) to select and program each pixel circuit to provide a particular brightness or luminance. More specifically, select line driver 302 is configured to select a row of pixels circuits for programming by placing an appropriate voltage on one of the select lines 210. For example, select line driver 302 can select pixel circuits 200-2, 200-5, and 200-8 for programming by placing an appropriate voltage on the select line, of select lines 212, coupled to those pixels. In the embodiment where pixel circuits 200-2, 200-5, and 200-8 have the same orientation and construction as pixel circuit 200 in FIG. 2, select line driver 302 selects the row of pixel circuits by turning on their respective access TFTs.

Once selected, or once their access TFTs are tured on by select line driver 302, data line driver 304 can program a particular one of the selected pixel circuits by placing an appropriate programming voltage on the data line, of data lines 212, coupled to that particular pixel circuit. For example, assuming pixel circuits 200-2, 200-5, and 200-8 are selected by select line driver 302, data line driver 304 can program pixel circuit 200-5 by placing an appropriate programming voltage on the data line, of data lines 212, coupled to pixel circuit 200-5. The programming voltage is programmed onto the gate of the drive TFT of the particular pixel circuit and, because the drive TFT is biased in its saturation region in the display mode as described above in FIG. 2, the programming voltage on its gate determines the current through the OLED of the pixel circuit and, thereby, its brightness or luminance.

Each OLED in the array of pixel circuits 200-1 through 200-9 operating in the display mode can be individually selected and programmed in the manner described above using select line driver 302 and data line driver 304 to format or create an image for display by AMOLED display 300. The OLED of each pixel circuit 200-1 through 200-9 operating in the display mode is forward biased by a positive voltage (sufficient to forward bias the OLEDs) applied across first bias voltage lines 214 and second bias voltage lines 216 coupled to those pixel circuits (i.e., the voltage on first bias voltage lines 214 relative to second bias voltage lines 216 is positive).

In operating one or more of pixel circuits 200-1 through 200-9 in the sense mode, select line driver 302 and data line driver 304 work together under the control of the controller (not shown) to select and program one or more columns of pixel circuits (or portions of one or more columns of pixel circuits) to be used to sense light for some period of time, rather than emit light. For example the column of pixel circuits 200-1, 200-2, and 200-3 can be selected by select line driver 302 and programmed by data line driver 304 such that their respective drive TFTs operate in their linear region of operation, as opposed to their saturation region of operation. More specifically, and in one embodiment, data line driver 304 can program the gates of each drive TFT corresponding to pixel circuits 200-1, 200-2, and 200-3 with the same or similar voltages such that the drive TFTs operate in their linear region of operation with the same or similar on resistance.

In addition, to operate in the sense mode, the one or more columns of pixel circuits to be used to sense light are placed into a photovoltaic and/or photoconductive mode by sensing circuit 306 under the control of the controller (not shown). More specifically, sensing circuit 306 includes a series of switches S1, S2, and S3 each coupled to a respective column of the array of pixel circuits 200-1 through 200-9. Each switch couples the first bias voltage line, of first bias voltage lines 214, of its respective column of pixel circuits to one of two different bias voltages, Vb1 and Vb3, depending on the mode in which the column of pixel circuits is to operate.

For example, if the column of pixel circuits 200-1, 200-2, and 200-3 is to operate in the display mode, the controller can control switch S1 to couple the first bias voltage line (of first bias voltage lines 214 corresponding to the column of pixel circuits 200-1, 200-2, and 200-3) to bias voltage Vb1. Bias voltage Vb1 is positive relative to bias voltage Vb2, which is coupled to the second bias voltage line (of second bias voltage lines 216 corresponding to the column of pixel circuits 200-1, 200-2, and 200-3). Thus, pixel circuits 200-1, 200-2, and 200-3 are forward biased and able to emit light in a display mode.

On the other hand, if the column of pixel circuits 200-1, 200-2, and 200-3 is to operate in the sense mode, the controller can control switch S1 to couple the first bias voltage line (of first bias voltage lines 214 corresponding to the column of pixel circuits 200-1, 200-2, and 200-3) to bias voltage Vb3. Bias voltage Vb3 is either negative relative to bias voltage Vb2, which is coupled to the second bias voltage line (of second bias voltage lines 216 corresponding to the column of pixel circuits 200-1, 200-2, and 200-3), or is equal to bias voltage Vb2. Thus, pixel circuits 200-1, 200-2, and 200-3 are either reverse biased and in their photoconductive mode or unbiased and in their photovoltaic mode and, as a result, are able to sense light in a sense mode.

As noted above, the column of pixel circuits 200-1, 200-2, and 200-3 each include an OLED coupled in series with a channel of a drive TFT as shown in FIG. 2. The series coupled OLED and drive TFT of each of these pixel circuits 200-1, 200-2, and 200-3 in the column are further coupled together in a parallel combination. A current sensor, included in sensing circuit 306, is configured to measure the current produced and flowing through this parallel combination as a result of light striking the surface of the OLEDs of pixel circuits 200-1, 200-2, and 200-3 while operating in the sense mode.

The current sensor, in sensing circuit 306, that is specifically configured to measure the current produced by light striking the OLEDs of pixel circuits 200-1, 200-2, and 200-3 includes an impedance Z1 that has some resistive component and a sense amplifier SA1. The resistive component of impedance Z1 converts the current produced by light striking the OLEDs of pixel circuits 200-1, 200-2, and 200-3 into a sense voltage that is then amplified by sense amplifier SA1. Sense amplifier SA1 outputs a voltage representative of the magnitude of the measured current and provides this voltage to a current reporting circuit 308 for reporting to the controller (not shown).

Figure 5:
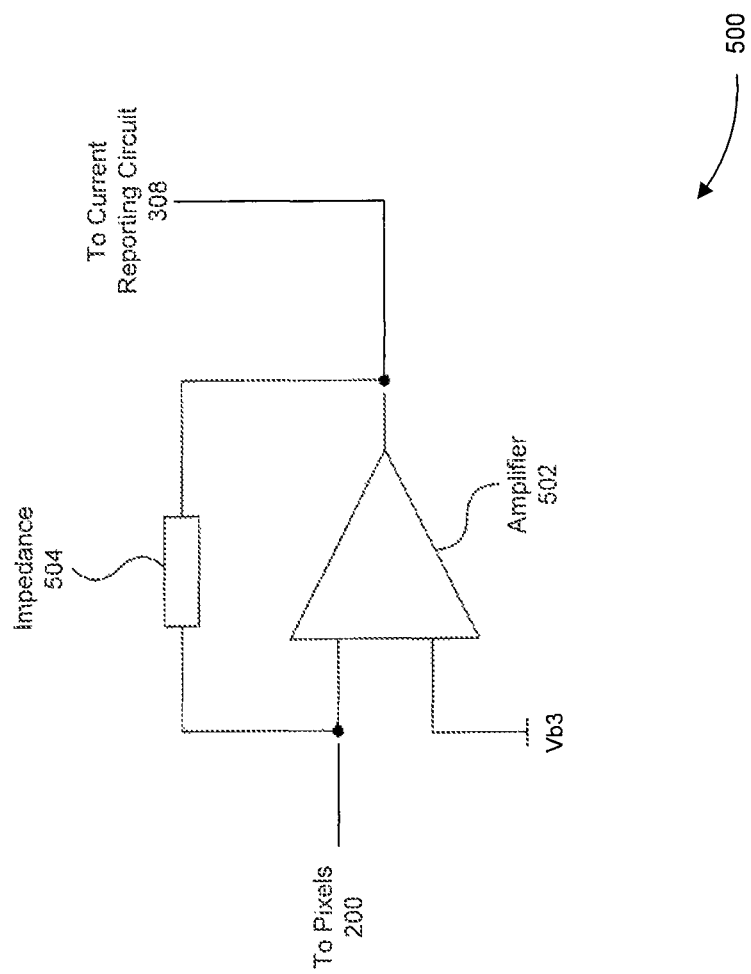
FIG. 5 illustrates a current sensor in accordance with embodiments of the present disclosure.

Other columns of pixel circuits in the array of pixel circuits 200-1 through 200-9 have similar current sensor configurations. For example, the second column of pixel circuits 200-4, 200-5, and 200-6 is coupled to a current sensor having an impedance Z2 and a sense amplifier SA2, and the third column of pixel circuits 200-7, 200-8, and 200-9 is coupled to a current sensor having an impedance Z3 and a sense amplifier SA3. In addition, each of these current sensors further provides its respective output voltage to current reporting circuit 308 for reporting to the controller (not shown). It should be noted, however, that the current sensors shown in FIG. 3 for each column of pixel circuits represents only one possible current sensor configuration and that other current sensor configurations can be used. For example, FIG. 5 illustrates another current sensor 500 that can be used. Current sensor 500 includes an amplifier 502 and an optional feedback impedance 504.

Current reporting circuit 308 can communicate the output voltage of each current sensor to the controller (not shown) using any one of a variety of suitable means. In at least one embodiment, current reporting circuit 308 includes at least one multiplexer configured to select one of the output voltages of the current sensors of sensing circuit 306 for reporting to the controller at a time. In other embodiments of sensing circuit 306, not current reporting circuit 308 is used and the output voltages are sent directly to the controller without any intermediary processing besides, for example, conversion of the current sensor output voltages from an analog value to a digital value.

Once the output voltage of a current sensor is reported to the controller (not shown), the controller can use the output voltage, which is representative of the intensity of the light striking the column of OLEDs to which the current sensor corresponds, to estimate the ambient light conditions of the environment where AMOLED display 300 is currently operating. For example, and in one embodiment, the controller can low pass filter a number of samples of the output voltage, taken over some period of time and reported to it from one or more current sensors, to estimate the ambient light conditions of the environment where AMOLED display 300 is currently operating. In bright environments, light produced by AMOLED display 300 and reflected back on AMOLED display 300 is typically a non-dominant source of the estimated ambient light. In dark environments, however, light produced by AMOLED display and reflected back on AMOLED display 300 typically becomes a dominant source of the estimated ambient light.

Once estimated, the controller can use the estimated ambient light conditions to adjust the brightness or luminance of the OLEDs in AMOLED display 300 to meet, but not greatly exceed, the brightness or luminance required for the ambient light conditions, thereby reducing the power consumed by the display. Thus, if the estimated ambient light conditions are bright, the controller can increase the brightness or luminance of the OLEDs in AMOLED display 300, and if the estimated ambient light conditions are comparatively less bright, the controller can reduce the brightness or luminance of the OLEDs in AMO LED display 300.

In addition, the controller can further use the estimated ambient light conditions to perform a touch and/or proximity sensing function. For example, and in one embodiment, the controller can determine that one or more pixel circuits of a column of pixel circuits in AMOLED display 300 has been touched by a finger or some other object based on a difference between a light level associated with one or more samples of the output voltage of a current sensor associated with those pixel circuits taken during a period of time and the current estimate of the ambient light level. If the difference is greater than some threshold amount, a touch of one or more of those pixel circuits in the column may be determined to have occurred by the controller. In general, the estimated ambient light conditions are used to "calibrate" the touch sensing function. The proximity of an object to one or more pixel circuits of a column of pixel circuits in AMOLED display 300 can be determined in a similar manner.

In yet another example, the controller can further use the estimated ambient light conditions and one or more pixel circuits configured to operate in both the sense and display mode to perform a document scanning function commonly used for facsimile operations, or to perform a fingerprint scanning function commonly used for physical user authentication security operations.

It should be noted that the array of pixel circuits 200-1 through 200-9 only includes a small number of pixel circuits for the sake of clarity. However, in an actual implementation of AMOLED display 300, the array generally will include substantially more pixel circuits, although not all pixel circuits necessarily will function to both emit light in a display mode and sense light in a sense mode.

For example, small groups of pixel circuits can be configured to operate in both the display mode and the sense mode, while other pixel circuits are configured to operate solely in the display mode. The groups of pixel circuits configured to operate in both the display mode and the sense mode can be distributed throughout the array of pixel circuits making up the AMOLED display and can include any number of pixel circuits. For example, 10×10, 20×10, or non-rectangular groupings of pixel circuits configured to operate in both the display mode and the sense mode and can be distributed through the array of pixel circuits making up the AMOLED display, with pixel circuits that only are configured to operate in the display mode placed in between the groups of dual-functioning pixel circuits.

In addition, the groups of dual-functioning pixel circuits can be placed in the sensing mode at the same or different times and for the same or different durations. However, in at least one embodiment, the groups of dual-functioning pixel circuits are placed in the sensing mode for only a limited period of time before being placed back into a display mode such that a user of the AMOLED display cannot readily perceive when the groups of dual-functioning pixel circuits are not operating in the display mode or that they are being used for two purposes.

It should be further noted that pixel circuit 200 provides only one example of a pixel circuit for implementing pixel circuits 200-1 through 200-9 illustrated in FIG. 3. Other pixel circuits can be further used in embodiments of the present disclosure. For example, other pixel circuits with additional circuitry (e.g., for compensating non-uniformities and stability issues associated with TFTs), different TFT types (e.g., n-type rather than p-type), and/or different programming methods (e.g., current-programming rather than voltage-programming) can be used. However, each pixel circuit implementation will generally include a drive TFT having its channel in series with an OLED, similar to drive TFT 204 and OLED 202 in FIG. 2.

Figure 4:
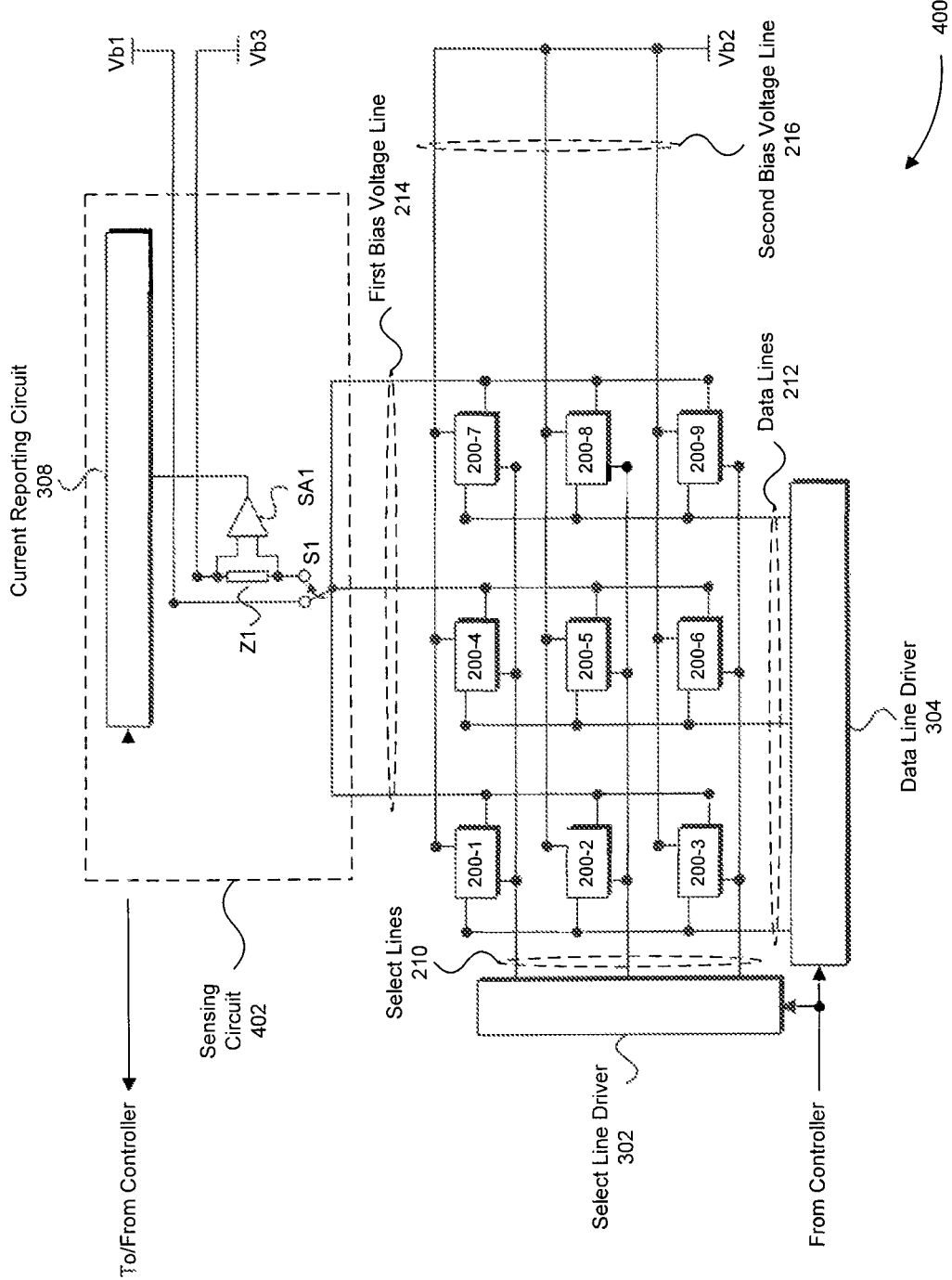
FIG. 4 illustrates another dual-function AMOLED display with pixel circuits that can function to both emit light and sense light in accordance with embodiments of the present disclosure.

Referring now to FIG. 4, a dual-function AMOLED display 400 with an array of pixel circuits 200-1 through 200-9 (each with the same orientation and construction as pixel circuit 200 in FIG. 2) that can function to both emit light in a display mode and sense light in a sense mode is illustrated in accordance with embodiments of the present disclosure. AMOLED display 400 is configured and functions in the same manner as AMOLED display 300 described above and illustrated in FIG. 3. However, AMOLED display 400 includes a different sensing circuit 402.

As illustrated in FIG. 4, sensing circuit 402 includes an exemplary current sensor comprised of an impedance Z1 and a sense amplifier SA1 that is coupled to more than one column of pixel circuits 200-1 through 200-9. By coupling the current sensor to more than one column of pixel circuits 200-1 through 200-9, the number of components and the complexity of sensing circuit 402 can be reduced. For example, rather than having a separate current sensor to sense the current flowing through each column of pixel circuits 200-1 through 200-9 that are operating in the sense mode, a single current sensor can be used for multiple columns of such pixel circuits. However, such grouping of columns can reduce sensing resolution and therefore some balance between the number of columns coupled to a single current sensor and the desired sensing resolution may be beneficial.

Figure 6:
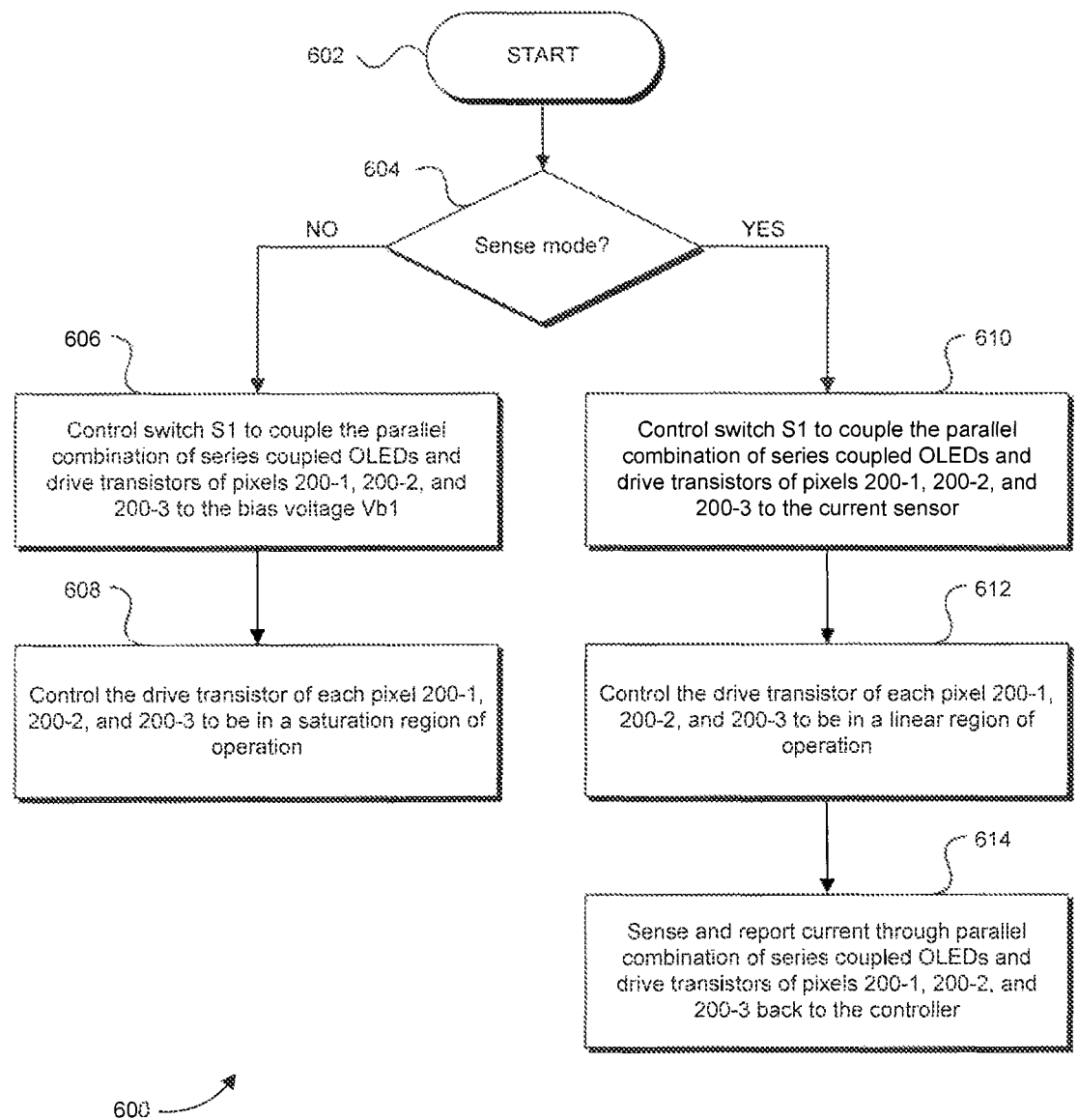
FIG. 6 illustrates a flowchart of a method for operating a dual-function AMOLED display in accordance with embodiments of the present disclosure.

Referring now to FIG. 6, a flowchart 600 of a method for operating a dual-function AMOLED display in accordance with embodiments of the present disclosure is illustrated. The method of flowchart 600 is described with continued reference to the dual-function AMOLED display 300 illustrated in FIG. 3. However, it should be noted that the method can be implemented by other AMOLED displays, such as AMOLED display 400 illustrated in FIG. 4. It should be further noted that some of the steps of flowchart 600 do not have to occur in the order shown in FIG. 6.

The method of flowchart 600 begins at step 602 and transitions to step 604. At step 604 a determination is made by the controller (not shown) of AMOLED display 300 as to whether a column of pixel circuits (or a portion of a column of pixel circuits) are to operate in a sense mode or in a display mode. For exemplary purposes, the column of pixel circuits 200-1, 200-2, and 200-3 illustrated in FIG. 3 will be used here for discussion purposes.

Assuming that the column of pixel circuits 200-1, 200-2, and 200-3 is to operate in the display mode and not the sense mode, flowchart 600 proceeds from step 604 to step 606. In step 606, the controller of AMOLED display 300 controls switch S1 to couple the parallel combination of series coupled OLEDs and drive transistors of the column of pixel circuits 200-1, 200-2, and 200-3 to bias voltage Vb1, which is sufficiently positive relative to bias voltage Vb2. When coupled to bias voltage Vb1, the column of pixel circuits 200-1, 200-2, and 200-3 are forward biased and can be used to emit light in the display mode as described above.

After step 606, flowchart 600 transitions to step 608, where the controller of AMOLED display 300 further controls the drive transistor of each pixel in the column of pixel circuits 200-1, 200-2, and 200-3 to be biased in their saturation region of operation.

Assuming now that the column of pixel circuits 200-1, 200-2, and 200-3 is to operate in the sense mode and not the display mode, flowchart 600 proceeds from step 604 to step 610. In step 610, the controller of AMOLED display 300 controls switch S1 to couple the parallel combination of series coupled OLEDs and drive transistors of the column of pixel circuits 200-1, 200-2, and 200-3 to bias voltage Vb3, which is either equal to or sufficiently negative relative to bias voltage Vb2. When coupled to bias voltage Vb3, the column of pixel circuits 200-1, 200-2, and 200-3 are either unbiased or reverse biased and can be used to sense light in the sense mode as described above.

After step 610, flowchart 600 transitions to step 612, where the controller of AMOLED display 300 further controls the drive transistor of each pixel in the column of pixel circuits 200-1, 200-2, and 200-3 to be biased in their linear region of operation.

After step 612, flowchart 600 transitions to step 614. In step 614, the current flowing through the parallel combination of series coupled OLEDs and drive transistors of the column of pixel circuits 200-1, 200-2, and 200-3 operating in the sense mode is sensed and reported to the controller of AMOLED display 300. The controller can then use the value of the reported current to estimate the ambient light conditions of the environment where AMOLED display 300 is currently operating.

III. Example Computer System Implementation

It will be apparent to persons skilled in the relevant art(s) that various elements and features of the present invention, as described herein, can be implemented in hardware using analog and/or digital circuits, in software, through the execution of instructions by one or more general purpose or special-purpose processors, or as a combination of hardware and software.

Figure 7:
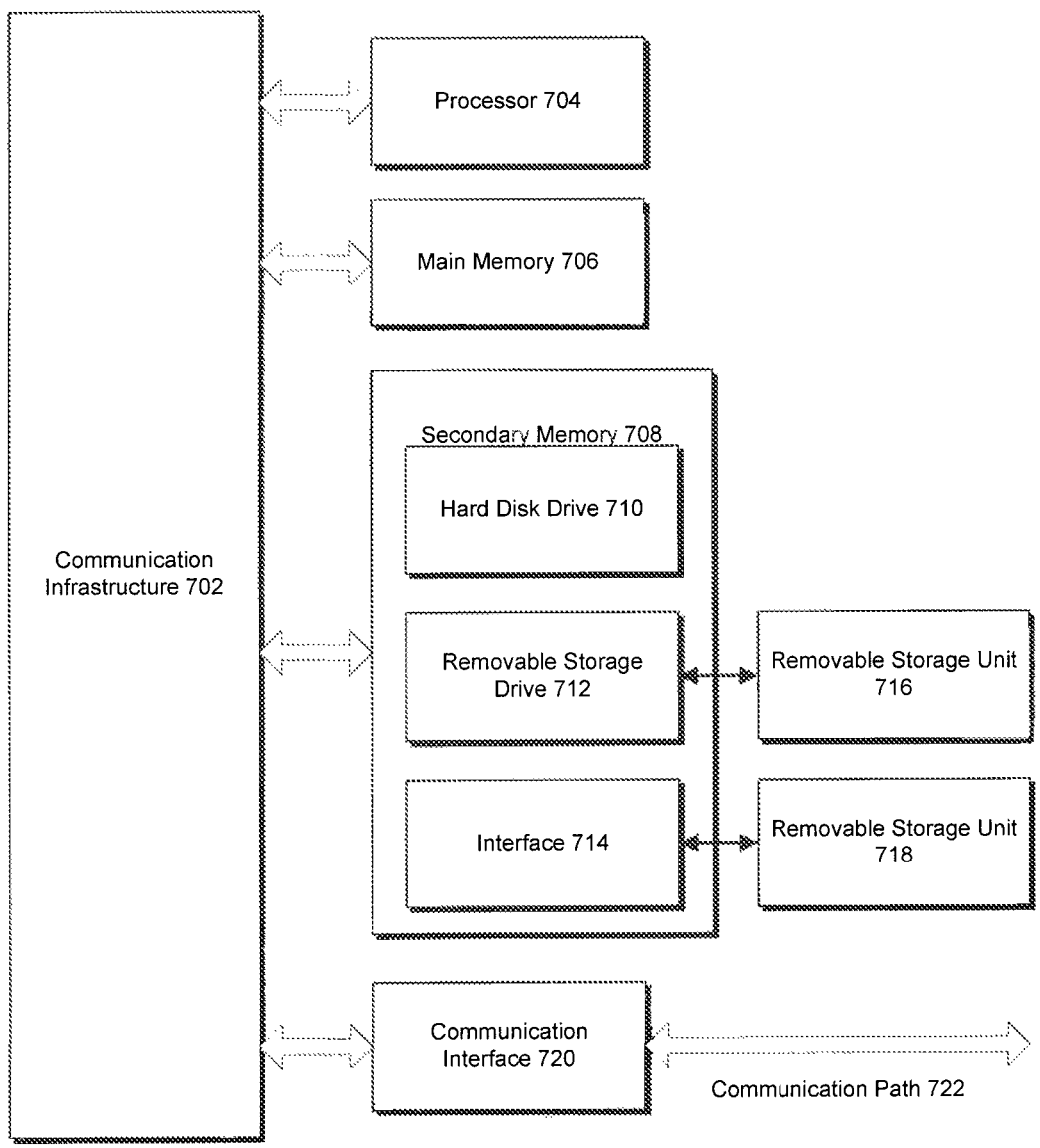
FIG. 7 illustrates an example computer system that can be used to implement aspects of the present disclosure.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 700 is shown in FIG. 7. The controller (not shown) of AMOLED display 300 and AMOLED display 400 and each of the steps of the flowchart depicted in FIG. 6 can be implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the invention using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevart art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present invention as discussed herein. In particular, the computer programs, when executed, enable processor 704 to implement the processes of the present invention, such as any of the methods described herein. Accordingly, such computer programs represent controllers of the computer system 700. Where the invention is implemented using software, the software may be stored in a computer program product and loaded into computer system 700 using removable storage drive 712, interface 714, or communications interface 720.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. Conclusion

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A dual-function organic light emitting diode (OLED) display, comprising:
   a column of pixels each comprising an OLED coupled in series with a channel of a drive transistor, wherein the series coupled OLED and drive transistor of each pixel in the column of pixels are coupled together in a parallel combination;
   a current sensor configured to convert a current flowing through the parallel combination into an output voltage;
   a switch configured to decouple the parallel combination from the current sensor in a first switching state and to couple the parallel combination to the current sensor in a second switching state; and
   a controller configured to control the switch to be in the first switching state and the drive transistor of each pixel in the column of pixels to be in a saturation region of operation if the column of pixels is to function in a display mode, and to control the switch to be in the second switching state and the drive transistor of each pixel in the column of pixels to be in a linear region of operation if the column of pixels is to function in a sense mode,
   wherein the controller is further configured to determine an ambient light level in an environment of the dual-function OLED display based on samples of the output voltage.

2. The dual-function OLED display of claim 1, wherein the switch is further configured to couple a first end of the parallel combination to a first bias voltage in the first switching state, wherein the first bias voltage is positive relative to a second bias voltage coupled to a second end of the parallel combination.

3. The dual-function OLED display of claim 2, wherein the switch is further configured to couple the first end of the parallel combination to a third bias voltage in the second switching state, wherein the third bias voltage is negative relative to the second bias voltage coupled to the second end of the parallel combination.

4. The dual-function OLED display of claim 2, wherein the switch is further configured to couple the first end of the parallel combination to a third bias voltage in the second switching state, wherein the third bias voltage is equal to the second bias voltage coupled to the second end of the parallel combination.

5. The dual-function OLED display of claim 1, wherein the current sensor comprises:
   an impedance configured to convert the current flowing through the parallel combination into a sense voltage; and
   an amplifier configured to amplify the sense voltage to provide the output voltage.

6. The dual-function OLED display of claim 1, further comprising:
   a current reporting circuit configured to communicate the output voltage to the controller.

7. The dual-function OLED display of claim 6, wherein the current reporting circuit includes a multiplexer.

8. The dual-function OLED display of claim 1, wherein the controller is further configured to adjust a brightness of the column of pixels when functioning in the display mode based on the ambient light level.

9. The dual-function OLED display of claim 1, wherein the controller is further configured to determine that the column of pixels has been touched during a period of time based on a difference between a light level associated with one or more additional samples of the output voltage taken during the period of time and the ambient light level.

10. The dual-function OLED display of claim 1, wherein the controller is further configured to determine a proximity of an object to the column of pixels during a period of time based on a difference between a light level associated with one or more additional samples of the output voltage taken during the period of time and the ambient light level.

11. A method for operating a dual-function organic light emitting diode (OLED) display that includes a column of pixels each comprising an OLED coupled in series with a channel of a drive transistor, the series coupled OLED and drive transistor of each pixel in the column of pixels coupled together in a parallel combination, the method comprising:
   converting a current flowing through the parallel combination into an output voltage using a current sensor;
   decoupling the parallel combination from the current sensor using a switch in a first switching state;
   coupling the parallel combination to the current sensor using the switch in a second switching state;
   controlling the switch to be in the first switching state and the drive transistor of each pixel in the column of pixels to be in a saturation region of operation if the column of pixels is to function in a display mode;
   controlling the switch to be in the second switching state and the drive transistor of each pixel in the column of pixels to be in a linear region of operation if the column of pixels is to function in a sense mode; and
   determining an ambient light level in an environment of the dual-function OLED display based on samples of the output voltage.

12. The method of claim 11, further comprising:
coupling a first end of the parallel combination to a first bias voltage using the switch in the first switching state, wherein the first bias voltage is positive relative to a second bias voltage coupled to a second end of the parallel combination.

13. The method of claim 12, further comprising:
coupling the first end of the parallel combination to a third bias voltage using the switch in the second switching state, wherein the third bias voltage is negative relative to the second bias voltage coupled to the second end of the parallel combination.

14. The method of claim 12, further comprising:
coupling the first end of the parallel combination to a third bias voltage using the switch in the second switching state, wherein the third bias voltage is equal to the second bias voltage coupled to the second end of the parallel combination.

15. The method of claim 11, wherein determining the ambient light level in the environment of the dual-function OLED display further comprises:
low pass filtering the samples of the output voltage.

16. The method of claim 11, further comprising:
adjusting a brightness of the column of pixels when functioning in the display mode based on the ambient light level.

17. The method of claim 11, further comprising:
determining that the column of pixels has been touched during a period of time based on a difference between a light level associated with one or more additional samples of the output voltage taken during the period of time and the ambient light level.

18. The method of claim 11, further comprising:
determining a proximity of an object to the column of pixels during a period of time based on a difference between a light level associated with one or more additional samples of the output voltage taken during the period of time and the ambient light level.

19. A dual-function organic light emitting diode (OLED) display, comprising:
a column of pixels each comprising an OLED coupled in series with a channel of a drive transistor, wherein the series coupled OLED and drive transistor of each pixel in the column of pixels are coupled together in a parallel combination;
a current sensor configured to convert a current flowing through the parallel combination into an output voltage;
a switch configured to decouple the parallel combination from the current sensor in a first switching state and to couple the parallel combination to the current sensor in a second switching state; and
a controller configured to control the switch to be in the first switching state and the drive transistor of each pixel in the column of pixels to be in a saturation region of operation if the column of pixels is to function in a display mode, and to control the switch to be in the second switching state and the drive transistor of each pixel in the column of pixels to be in a linear region of operation if the column of pixels is to function in a sense mode,
wherein the controller is further configured to determine an ambient light level in an environment of the dual-function OLED display by low pass filtering samples of the output voltage.

20. The dual-function OLED display of claim 19, wherein the controller is further configured to adjust a brightness of the column of pixels when functioning in the display mode based on the ambient light level.

21. The dual-function OLED display of claim 19, wherein the controller is further configured to determine that the column of pixels has been touched during a period of time based on a difference between a light level associated with one or more samples of the output voltage taken during the period of time and the ambient light level.

22. The dual-function OLED display of claim 19, wherein the controller is further configured to determine a proximity of an object to the column of pixels during a period of time based on a difference between a light level associated with one or more samples of the output voltage taken during the period of time and the ambient light level.

* * * * *